Patented Oct. 20, 1953

2,656,398

UNITED STATES PATENT OFFICE 2,656,398

POLYMERIZATION OF UNSATURATED COMPOUNDS WITH PALLADIUM OXIDE CONTAINING CATALYST

Albert N. De Vault, Bartlesville, Okla., assignor to Phillips Petroleum Company, a corporation of Delaware No Drawing. Application November 10, 1949, Serial No. 126,697

6 Claims. (Cl. 260—683.15)

This invention relates to the polymerization of organic compounds containing unsaturated carbon-to-carbon bonds. In certain of its more specific aspects the invention relates to the catalytic polymerization of low-boiling mono-olefinic hydrocarbons. In a preferred embodiment the invention pertains to the polymerization of ethylene.

The polymerization of olefins to higher-boiling olefins is not new. It has been standard refinery practice to polymerize propylene and butylenes to gasoline boiling range hydrocarbons. This may be accomplished quite readily by the use of such catalysts as so called solid phosphoric acid, silica-alumina, hot or cold sulfuric acid, and numerous others. The resulting liquid olefins may be blended into gasoline, or may first be hydrogenated to the corresponding paraffins and then used as fuel components.

In refinery operations such as cracking in which propylene and butylene are formed, substantial quantities of ethylene are also produced. Ethylene is quite a useful and valuable compound for use in the synthesis of various chemicals. However, most refineries are not engaged in the production of chemicals wherein ethylene is used as a starting material, and are not so located that the ethylene may be sold to others who can utilize it in chemical synthesis. It is, therefore, highly desirable to utilize the ethylene produced in the production of gasoline, for in most cases this is its most logical utilization. However, due to the difficulty of ultimate conversion of ethylene to gasoline, this compound ordinarily goes to residue gas and is used for fuel in furnaces, boilers, and the like, or may even be burned in a flare.

Ethylene may also be produced in large quantities by the cracking of ethane, propane, or mixtures of the two, thus converting these low-boiling paraffins to the more valuable ethylene. Heretofore, however, this type of operation has been carried out only to produce ethylene for chemical use, or as an alkylating olefin in the production of high octane number gasoline hydrocarbons such as neo-hexane and diisopropyl.

Ethylene is far less reactive than the higher boiling olefins such as propylene and the butylenes, so much so that catalysts quite effective for polymerization of the $C_3$ and $C_4$ olefins are ineffective for polymerizing ethylene to higher molecular weight olefins, usually in gasoline boiling range, which may be utilized by conventional refinery methods.

An object of this invention is to polymerize unsaturated organic compounds containing at least one carbon-to-carbon double bond in the molecule.

A further object of the invention is to polymerize olefinic hydrocarbons to higher boiling olefins.

Another object of the invention is to effect polymerization of unsaturated hydrocarbons in the presence of an extremely active polymerization catalyst.

Yet another object is to provide a novel catalytic process for the polymerization of ethylene at moderate reaction conditions.

Further objects and advantages of the invention will be apparent, to one skilled in the art, from the accompanying disclosure and discussion.

I have now found that ethylene, as well as higher olefins and other unsaturated organic compounds, can be polymerized at relatively low temperatures and moderate pressures in the presence of a catalyst comprising a small amount of palladium oxide on a porous siliceous base. Preferably this base is a synthetic silica gel containing a small quantity of alumina. This catalyst has an unexpectedly high polymerization activity. Only a very small quantity of palladium oxide is necessary when supported on a siliceous material of high surface area. Of the various materials suitable for the catalyst base, there may be mentioned: silica gel; synthetic silica gel containing minor quantities of alumina and prepared by various known methods, such as by co-precipitation, or by hydrolytic activation of a hydrous silica gel by soaking in an aqueous solution of a hydrolyzable aluminum salt such as aluminum chloride or aluminum sulfate; similar silica-zirconia compositions; silica-magnesia; silica-thoria; other composites of silica with oxides of groups IIIB and IVA metals as known to those skilled in the art; activated clays such as a magnesium substituted hydrogen montmorillonite known as Super-Filtrol; other clays such as fuller's earth activated by mild heating and/or acid treating; and various others which will be apparent to one skilled in the art from the present disclosure.

The catalyst is utilized in conventional apparatus in which ethylene (or other olefin), usually as a concentrate rather than in a pure stream, is passed over a stationary bed of catalyst particles at the desired temperature, pressure and flow rate, and the polymer is recovered from the effluent stream by fractional distillation or other suitable means. Other methods of contacting catalyst with reactants, such as using powdered catalyst in a "fluidized bed," may be employed. Unconverted ethylene or other reactant may be recovered from the reaction effluent and recycled. If desired, polymer fractions lighter than those to be recovered as product may be separated and returned to the reaction for further polymerization.

The catalysts of this invention may be prepared in several ways. Essentially, the steps in the preparation of the catalyst are impregnation of the porous siliceous carrier with a palladium compound, and subsequently converting the palladium contained therein to palladium oxide. Specifically, the carrier may be soaked with a water solution of palladium chloride or nitrate, dried, and subsequently heated in a stream of air or oxygen to convert the metal salt to the oxide. Though lower or higher temperatures may be used, it is preferred that the heating be between 450 and 650° C. Lower temperatures result in slow conversion to the oxide, and excessively high temperatures may damage the carrier. Temperatures over 860° C. should not be used at all, for slightly above this temperature elemental palladium is produced rather than the oxide. Many palladium compounds may be chemically reduced to produce the metal, and less preferably these may be used by impregnating the carrier with the palladium salt, reducing the salt to produce a palladium-impregnated carrier, and subsequently oxidizing the palladium to the oxide by heating to between 450 and 650° C. in air or oxygen. Difficulty in converting palladium metal to the oxide makes this method less preferred than the first described wherein a palladium compound is simultaneously decomposed and converted to the oxide on the carrier. Oxidation of palladium metal can be facilitated if desired by incorporating small amounts of chlorine or other halogen in the air stream, particularly if the carrier is reasonably free from alumina although the alumina present in clay is not objectionable when using this chlorine treatment. The palladium metal can be prepared for example by impregnating the carrier with palladium acetate, reducing same with hydrogen or heating same in the absence of oxygen, then following with the oxidation step. However, it is preferred to use the acetate or other palladium compound without intermediate reduction to the metal but rather simultaneously decomposing and oxidizing to form palladium oxide on the carrier.

The proportion of palladium metal in the final catalyst (calculated as metal but present in the form of oxide) can be from 0.01 to 2 weight per cent or even more, but preferably between 0.02 and 0.5 weight per cent.

The preferred carrier is a synthetic silica-alumina material composed of a porous synthetic silica gel of suitable granule size, such as 8 to 14 mesh, and preferably containing from 0.1 to 25 weight per cent of alumina, which may be present through impregnation or coprecipitation by known methods. When the silica gel is impregnated with alumina, it is preferred that not over 5 weight per cent alumina is present; but up to 25 weight per cent is quite satisfactory when the silica and alumina are coprecipitated. Although silica-alumina is a known type of polymerization catalyst, the composite of same with palladium oxide as described herein is capable of effecting polymerization at conditions much milder than the minimum required for polymerizing the same olefin with the silica alumina alone.

The feed to the process will ordinarily be a concentrate of ethylene rather than substantially pure ethylene. Ethylene is ordinarily a product of cracking, and along with the ethylene there will be methane and ethane produced, as well as $C_3$ and higher products. It is neither necessary nor practical to free the ethylene of these other components, though in many instances it may be quite practical to concentrate the ethylene to 50 mole per cent or even somewhat higher purity before charging to the polymerization process. To effect this concentration, oil absorption, low temperature fractionation, or combination of these may be used. It is, of course, quite possible to use as a feed substantially pure ethylene when available. It is preferred that hydrogen be absent, since it reduces palladium oxide.

Other organic compounds containing unsaturated carbon-to-carbon double bonds may also be polymerized with the catalyst described herein, suitable conditions of course depending greatly on the particular material to be treated. Preferably the monomer to be polymerized contains not in excess of ten carbon atoms per molecule. Especially suitable feed stocks comprise propylene, and one or more of the butenes, either butene-1, butene-2 or isobutylene. Five- and six-carbon-atom olefins, either open chain or cyclic such as cyclohexene, may also be polymerized, and even higher olefins are operable, but it is seldom desired to subject same to polymerization. Diolefins such as butadiene, and actylenes such as acetylene itself or methyl acetylene, are polymerized when contacted with the present catalyst under suitable conditions, but the catalyst life is usually short when treating such easily polymerized feed materials which tend to form heavy polymers that stick to the catalyst and rapidly reduce its activity. The same is true of styrene, which may be considered a phenyl-substituted ethylene, but which is much more reactive than ethylene. One or more constitutents may be substituted on an olefin hydrocarbon, so long as the constituent is not poisonous to the catalyst or is not so highly reactive in itself as to take precedence over the desired polymerization reaction. Such substituents may be halogen, hydroxy, or carboxy. Thus, vinyl chloride, chloroprene, allyl alcohol, and unsaturated acids such as crotonic or acrylic acids, are all polymerizable to some extent at least with my catalyst. Single unsaturated compounds or mixtures of two or more may be polymerized. Thus a mixture of butene-2 and isobutylene is readily co-polymerized to form a copolymer composed largely of 2,2,3-trimethyl-pentene, which may then be hydrogenated non-destructively to form so-called methyl triptane.

As indicated hereinabove, optimum reaction conditions will depend greatly on the particular reactant, its extent of dilution, and the like. In general, milder conditions are used for the higher molecular weight olefins or other reactants. Broadly speaking, suitable operating temperatures for the polymerization are from 0 to 250° C., and preferably between 25 and 150° C. With ethylene the partial pressure in the charge is preferably at least 15 pounds per square inch it may be as high as 1000 p. s. i. or more, although ordinarily pressure will be coordinated with concentration so that the ethylene partial pressure is in the range of 100 to 500 p. s. i. Ethylene polymerization is almost always conducted in the gas phase, but sufficient pressure to insure liquid phase is often used with higher olefins. The rate of charging ethylene to the reaction zone should be within the range of 0.5 to 25 pounds of ethylene per 100 pounds of catalyst per minute, the rate being such that the desired conversion per pass be accomplished at the particular temperature and pressure of operation.

In operating the process of this invention, several modifications are possible. For example, the conditions may be so chosen that the ethylene is to a great extent converted to trimers and higher; these then are used in gasoline and the dimer and unconverted monomer recycled to produce trimer and higher. The operating conditions may also be so chosen to produce predominantly dimer, i. e. butenes in the case of ethylene reactant, and the dimer utilized as such or further polymerized over another catalyst to produce higher boiling polymer. Choice of conditions depends upon the product desired. In general, longer time and higher pressure give a greater proportion of the trimer, the pressure having more effect in the case of ethylene than in the case of higher olefins undergoing liquid phase polymerization. Isobutylene tends to give a fairly high proportion of trimer at the conditions ordinarily employed for its polymerization whereas ethylene tends more towards production of dimer. One skilled in the art will readily be able to determine by simple trial, in view of his knowledge of the art and the present disclosure, suitable conditions for any particular reactant.

The catalysts of this invention may be reactivated whenever this is necessary because of accumulation thereon of carbonaceous deposits. Reactivation with a hot stream of oxygen-containing gases, such as with steam or air or both, may be effected at temperatures which preferably do not exceed 1200° F.

*Example*

As an indication of the high activity of the catalyst and its use in effecting the polymerization of ethylene at temperatures much lower than ordinarily necessary for ethylene polymerization, the following information is presented by way of example. It will be appreciated that variations in the exact quantities and materials shown may be made without departing from the invention and its broader aspects.

An active catalyst was prepared by saturating 50 grams of a synthetic silica-alumina gel type carrier (1 weight per cent alumina) with a solution containing a total of 0.057 gram of palladous chloride. The amount of palladium calculated as the metal and based on the weight of the carrier was 0.068 weight per cent. Activation of the catalyst was accomplished by drying in an oven at 120° C. and then heating in a stream of air at 550° C. for 45 minutes.

The catalyst was then used for polymerization of ethylene under the following conditions:

Pressure, p. s. i. g. _____ 250
Temperature, °C. _____ 50
Ethylene flow rate, g./min./g. catalyst ____ 0.053

The yield of dimer per pass was 9.9 weight per cent, and the yield of trimer per pass was 1.2 weight per cent, based on ethylene charged.

I claim:

1. A process for the polymerization of ethylene which comprises contacting ethylene at temperature in the range 0 to 250° C. with a catalyst consisting essentially of palladium oxide on a porous siliceous base.

2. A process for the polymerization of ethylene which comprises contacting ethylene at a temperature between 25 and 150° C. with a catalyst consisting of palladium oxide in an amount of from 0.01 to 2 weight per cent calculated as palladium metal supported on a porous siliceous base.

3. A process according to claim 2 in which said base is a synthetic gel composed of silica and alumina said alumina being present in quantity of from 0.1 to 25 weight per cent.

4. A process according to claim 2 in which said base is a synthetic silica gel combined with a minor amount of a metal oxide selected from the group consisting of alumina, zirconia, magnesia, and thoria.

5. A process according to claim 2 in which said base is an acid-activated clay.

6. A process for the polymerization of ethylene which comprises contacting ethylene at a temperature in the range of 25 to 150° C., a pressure in the range of atmospheric to 500 p. s. i. and at a rate in the range of 0.5 to 25 pounds of ethylene per minute per 100 pounds of catalyst with a catalyst consisting of palladium oxide in an amount of from 0.01 to 2 weight per cent calculated as palladium metal supported on a base consisting of a synthetic gel of silica and alumina, said alumina being present in quantity of from 0.1 to 25 weight per cent.

ALBERT N. DE VAULT.

References Cited in the file of this patent

UNITED STATES PATENTS

| Number | Name | Date |
|---|---|---|
| 1,988,112 | Egloff | Jan. 13, 1935 |
| 2,207,868 | Martin | July 16, 1940 |
| 2,331,915 | Kirkpatrick | Oct. 19, 1943 |
| 2,552,692 | Schulze et al. | May 15, 1951 |
| 2,589,189 | Ciapetta et al. | Mar. 11, 1952 |

FOREIGN PATENTS

| Number | Country | Date |
|---|---|---|
| 436,906 | Great Britain | Oct. 21, 1935 |